United States Patent [19]

Dick et al.

[11] 4,290,998

[45] Sep. 22, 1981

[54] WASHING APPARATUS IN CHLORINE DIOXIDE PRODUCTION

[75] Inventors: Peter D. Dick, Brampton; Gerald Cowley, Mississauga, both of Canada

[73] Assignee: Erco Industries Limited, Islington, Canada

[21] Appl. No.: 104,151

[22] Filed: Dec. 17, 1979

Related U.S. Application Data

[62] Division of Ser. No. 971,790, Dec. 21, 1978.

[51] Int. Cl.³ .................. B01J 8/12; B01D 12/00; B01D 43/00
[52] U.S. Cl. .................. 422/193; 422/224; 422/233; 422/281
[58] Field of Search ............ 423/478; 422/187, 189, 422/193, 224, 232, 233, 261, 273, 274, 275, 281, 291

[56] References Cited

U.S. PATENT DOCUMENTS

| | | | |
|---|---|---|---|
| 2,381,965 | 8/1945 | Berry | 422/273 X |
| 2,833,630 | 5/1958 | Loevenstein | 422/274 X |
| 3,201,491 | 8/1965 | Stine et al. | 210/24 R X |
| 3,975,505 | 8/1976 | Fuller | 423/478 |
| 4,049,785 | 9/1977 | Fuller | 423/478 |
| 4,156,713 | 5/1979 | Fuller | 423/478 |

OTHER PUBLICATIONS

Perry, Chemical Engineers' Handbook, pp. 950-953, 1082, 1083, 1084, 3rd Edit. (1950).

*Primary Examiner*—Bradley Garris
*Attorney, Agent, or Firm*—Sim & McBurney

[57] ABSTRACT

Washing apparatus for the washing of by-product salts from chlorine dioxide generating processes comprising a multi-stage decantation washer.

3 Claims, 2 Drawing Figures

WASHING APPARATUS IN CHLORINE DIOXIDE PRODUCTION

This is a division of application Ser. No. 971,790 Filed Dec. 21, 1978.

FIELD OF INVENTION

The present invention relates to the production of chlorine dioxide.

BACKGROUND TO THE INVENTION

It is known to produce chlorine dioxide by reduction of chlorate ions with chloride ions in the aqueous phase in the presence of free hydrogen ions, in accordance with the equation:

$$ClO_3^- + Cl^- + 2H^+ \rightarrow ClO_2 + \tfrac{1}{2}Cl_2 + H_2O$$

This process may be effected in a number of ways, broadly falling into two groups. In the first group, the chloride ions are added to the reaction medium, such as, in the form of a chloride salt, usually an alkali metal chloride, preferably sodium chloride, or as hydrochloric acid, while, in the second group, the chloride ions are formed in situ by reduction of the chlorine, usually using sulphur dioxide or methanol as the reducing agent.

A variety of strong acids may be used, alone or in admixture, to provide the free hydrogen ions required in the chlorine dioxide-producing reaction, such as, sulphuric acid, hydrochloric acid and phosphoric acid. Where hydrochloric acid alone is used as the source of the free hydrogen ions, it also acts as the source of chloride ion reducing agent. Where hydrochloric acid is used in admixture with other acids, it may also provide part or all of the chloride ion reducing agent, depending on the molar quantity used.

The chlorate ions usually are introduced to the reaction medium in the form of an alkali metal salt, preferably sodium chlorate. The cation of the chlorate, along with any other cations introduced to the reaction medium, combines with the anion of the acid to form a by-product salt. The following equations illustrate the formation of these by-products:

$$NaClO_3 + NaCl + H_2SO_4 \rightarrow ClO_2 + \tfrac{1}{2}Cl_2 + H_2O + Na_2SO_4$$

$$NaClO_3 + 2HCl \rightarrow ClO_2 + \tfrac{1}{2}Cl_2 + H_2O + NaCl$$

$$2NaClO_3 + SO_2 + H_2SO_4 \rightarrow 2ClO_2 + 2NaHSO_4$$

The by-product is removed from the reaction medium, on a continuous or intermittent basis, by crystallization as a solid phase. Such crystallization may be effected inside or outside the reaction vessel. Removal of the crystalline material from the mother liquor usually results in entrainment of some mother liquor.

Conventional separation techniques, such as, filtration and centrifugal separation, often in combination with wash water, have been used to separate the mother liquor and purify the by-product crystals, the separated mother liquor and spent wash water usually being returned to the generator containing the reaction medium to avoid loss of the chemical values thereof.

SUMMARY OF INVENTION

The present invention is directed to an improved washing procedure for use in conjunction with the prior art chlorine dioxide processes which results in a more efficient washing of the crystals free from entrained reaction medium. In the present invention, the by-product crystals are subjected to a multistage decantation-washing operation and purified crystals are removed from the decantation-washing.

The multistage decantation-washing is effected in a plurality of superimposed liquid- and solid-filled cylindrical compartments to which thickened crystal slurry from the next higher compartment is fed concurrently with wash water forwarded from the liquid overflow from the next lower compartment. In each compartment, the crystals fall to the bottom and are thickened prior to transfer to the next lower compartment while the aqueous phase is decanted from adjacent the top of the compartment for passage to the next-higher compartment.

GENERAL DESCRIPTION OF INVENTION

While the present invention has wide applicability to any chlorine dioxide generating process that produces a crystalline by-product, the invention is particularly useful in a number of specific chlorine dioxide-generating systems which are now described.

In U.S. Pat. No. 3,864,456, there is described the production of chlorine dioxide in admixture with chlorine and water vapor in a continuous process wherein sodium chlorate is reduced with chloride ions in an acid aqueous reaction medium containing sulphuric acid and having an acid normality of about 2 to about 4.8 normal. The reaction medium is maintained at its boiling point under a subatmospheric pressure applied to the reaction zone.

The chloride ions may be provided by sodium chloride, hydrogen chloride or mixtures thereof. Where hydrogen chloride is used to provide at least part of the chloride ion, this chemical also is used to provide part of the acid requirement, so that the acid is provided by a mixture of sulphuric and hydrochloric acids.

In this process, the by-product sodium sulphate deposits in crystalline neutral anhydrous form from the reaction medium once the reaction medium has become saturated therewith after start up.

In U.S. Pat. No. 3,563,702, it is indicated that the efficiency of chlorine dioxide production according to the procedure of U.S. Pat. No. 3,864,456, i.e. the extent to which chlorate in the reaction medium reacts to form chlorine dioxide, can be increased by the use of small amounts of catalyst, such as, vanadium pentoxide, silver ions, manganese ions, dichromate ions and arsenic ions.

The latter processes are effected above about 30° C. and below the temperature above which substantial decomposition of chlorine dioxide occurs, preferably in the range of about 50° to about 85° C., and particularly at about 65° to about 75° C. The vacuum applied to the reaction zone to provide the subatmospheric pressure therein is that necessary to achieve boiling at the reaction temperature and generally ranges from about 100 to about 400 mm Hg absolute.

At acid normalities above about 5 normal and up to about 12 normal in the reaction medium, chlorine dioxide may be produced at high efficiency in the absence of added catalyst using a procedure equivalent to that described in U.S. Pat. No. 3,864,456. At these higher acid normalities, however, the sodium sulphate crystallizes from the reaction medium in the form of acid sulphate, such as, sodium sesquisulphate or sodium bisulphate, depending on the acid normality of the reaction medium.

The sodium sulphate which is deposited from the reaction medium in the chlorine dioxide generator in these processes usually is withdrawn from the generator, on a continuous or intermittent basis, in the form of a slurry with reaction medium.

In Canadian Pat. Nos. 913,328 and 956,784, there is described the production of chlorine dioxide by reaction of sodium chlorate with hydrochloric acid at a total acid normality below about 1 normal, preferably in a single vessel generator-evaporator-crystallizer, in similar manner to that described in the aforementioned U.S. Pat. No. 3,864,456 with respect to sulphuric acid. The crystalline by-product in this case is sodium chloride.

Another process to which the present invention may be particularly applied is that described in U.S. Pat. No. 4,081,520 wherein methanol, sodium chlorate and sulphuric acid are reacted at high acid normality in a single vessel generator-evaporator-crystallizer to crystallize sodium bisulphate.

In U.S. Pat. No. 3,975,505 there is described a crystal washing procedure for neutral anhydrous sodium sulphate, such as is obtained by the process of U.S. Pat. No. 3,864,456, while in U.S. Pat. No. 4,045,542 there is described a crystal washing procedure for sodium chloride, such as is obtained by the process of Canadian Pat. Nos. 913,328 and 956,784. In both processes, the slurry is introduced to the top of a separator column and warm water, of temperature from about 30° to about 70° C., is introduced to the bottom of the column in countercurrent flow to the downward flow of slurry. The crystals contained in the downward flowing slurry are continuously washed by the water, the washed aqueous slurry is removed from the bottom of the column and the wash water containing chemicals washed from the slurry is passed to the generator.

The washing efficiency of the decantation washing procedure of this invention is considerably higher than that of the latter countercurrent washing operation. Thus, each stage of the decantation washing is at least 50% efficient while each stage in the prior patent procedure is about 20% efficient. Thus, to achieve at least the same overall washing efficiency as is achieved in 10 stages in the prior patent washer requires no more than four stages in the procedure of the invention.

The crystal slurry which is washed following the procedure of this invention may have a concentration varying widely but generally within the range of about 1 to about 30% w/w.

Prior to subjecting the slurry to the decantation washing, it first is thickened to remove some of the associated aqueous phase, such as, by use of a cyclone separator, or by suitable design of the top-most compartment of the decantation washing apparatus. This initial thickening generally results in a slurry of thickness of about 50 to about 80% w/w and this slurry concentration is that of the product from the washing operation.

The use of a cyclonic thickening operation is preferred in that the thickening operation is a rapid one and the aqueous phase of the thickened slurry is diluted by wash water in the first washing stage, which will decrease the concentration of reactants in the aqueous phase to a level insufficient to sustain any residual chlorine dioxide generation. Such residual chlorine dioxide generation otherwise may disturb proper settling of the crystals in the decantation-washing stages.

The thickened slurry is passed through the washing compartments of the multistage decantation washer while wash water which has passed through the plurality of compartments is removed usually for recycle to the chlorine dioxide generation system. Into the lowest compartment is fed fresh water while washed product is removed from that compartment.

The temperature of the wash water used in the washing operation may vary widely, generally from ambient temperature (about 20° C.) to about 80° C., depending upon the solid phase contained in the slurry being washed. For example, in the washing of sodium chloride crystals, the range of wash water temperatures may be from ambient temperature to about 80° C. In the case where anhydrous neutral sodium sulphate is washed, the temperature of the wash water may vary from about 30° C. to about 80° C., or preferably from about 38° C. to about 80° C. In the case where hydrated neutral sodium sulphate is washed, the temperature of the wash water may vary from ambient temperature to about 30° C. or preferably from about 20° C. to about 30° C.

In addition to being washed free of entrained contaminants, various sodium sulphates may be converted to other products during the washing operation. For example, when the solid product of the generator is a sodium acid sulphate, such as, sodium sesquisulphate or sodium bisulphate, which is the case when acid normalities above about 5 normal are employed in the reaction medium, the washing of the crystals with water is accompanied by conversion of the acid sulphate to neutral sodium sulphate as follows:

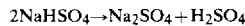

$$2NaHSO_4 \rightarrow Na_2SO_4 + H_2SO_4$$

Thus, no acid is lost with the acid sulphate but rather is returned to the generator, upon return of the used wash water to the generator.

The latter procedure is particularly beneficial since high acid normality chlorine dioxide generating processes are inherently highly efficient and catalysts are not required. Since the solid by-product of the process can be washed and at the same time converted to the neutral form with excess acid being returned to the generator, there is no economic penalty in lost acid resulting from the high acidity system.

The temperature of the wash water used in the latter process varies depending on whether the hydrated or anhydrous form of the neutral sodium sulphate is desired. If the hydrated form is desired, the wash water temperature is about 20° to about 30° C., while if the anhydrous form is desired, the wash water temperature is about 30° to about 80° C., preferably about 38° to about 80° C.

The washing process of the invention also can be used to result in hydrated neutral sodium sulphate from a slurry containing anhydrous neutral sodium sulphate by using wash water having a temperature of about 20° to about 30° C.

The invention has utility additional to decantation washing. Thus, the washing operation may be accompanied by metathesis or double decomposition reactions in which the solid phase of the slurry is converted to a different solid product, the metathesis reaction constituting a further embodiment of the invention.

Such a metathesis reaction involves reaction of the crystals with another material added to the decantation washer to result in two different products. The process is best illustrated by the reaction of neutral sodium sulphate with hydrochloric acid, as follows:

$$Na_2SO_4 + 2HCl \rightarrow 2NaCl + H_2SO_4$$

Where such a process is effected, hydrochloric acid may be fed to an intermediate compartment of the washer while fresh wash water is fed to the lower-most compartment, so that the metathesis reaction occurs throughout the upper compartments and washing of the solid phase of the metathesis thesis reaction occurs in the lower compartments of the metaresult in washed solid sodium chloride product for removal from the lower-most compartment and sulphuric acid for passage to the generator with the spent wash water.

Alternatively, the metathesis reaction only may be effected in one decantation washer by feeding the hydrochloric acid to the lower-most compartment. The sodium chloride crystals then may be transferred to a second decantation washer for washing free from entrained liquor.

While the metathesis reaction is conveniently conducted with hydrochloric acid of fairly high concentration, for example, about 32 to about 37 percent by weight of HCl, other hydrochloric acid concentrations may be used and under some circumstances hydrogen chloride gas may be fed to the decantation-washer in place of hydrochloric acid.

Other metathesis reactions involving sodium sulphate also are possible using oxalic acid, an aqueous solution of an alkali metal chloride or an aqueous solution of an alkaline earth metal chloride.

The temperature of the reactant chemical fed to the decantation-washer when such metathesis reactions are carried out depends upon a number of factors, including the nature of the metathesis reaction being effected, and typically is about 20° to about 35° C.

In U.S. Pat. No. 3,976,758, it is suggested that the separator column of U.S. Pat. No. 3,975,505 may be used for metathesis reactions.

The number of individual decantation-thickening stages used in the washing process of the invention and in the washing-metathesis combination process of the invention may vary widely depending on the size of the individual compartments and whether or not metathesis is involved and is at least two. Usually, about four compartments is adequate for efficient crystal washing.

The size of the decantation washer varies widely, depending on the size of the chlorine dioxide generator with which it is associated and the number of washing and/or reaction stages. Typical dimensions are a diameter of about 1 to about 3 feet and a height of about 12 to 16 feet.

DESCRIPTION OF PREFERRED EMBODIMENTS

Figure 1:
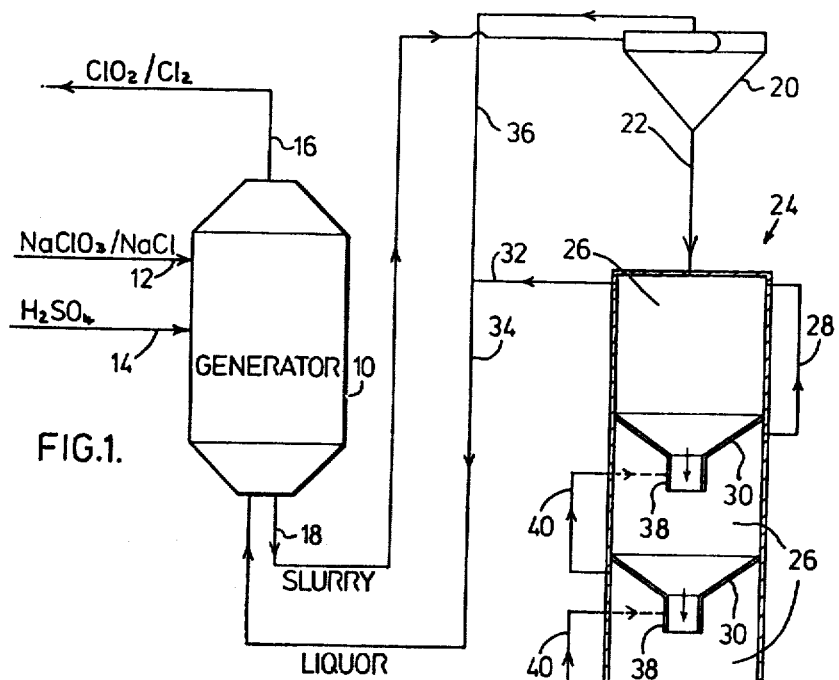
FIG. 1 is a schematic flow sheet of an apparatus for effecting the washing process of the invention in conjunction with a specific chlorine dioxide generating system.

Referring first to FIG. 1 of the drawings, a chlorine dioxide generator 10 contains an acid reaction medium of total acid normality of about 2 to about 4.8 normal to which sodium chlorate and sodium chloride reactants are fed by line 12 and sulphuric acid by line 14. Separate feeds of sodium chlorate and sodium chloride may be utilized, if desired. A catalyst may also be fed to the generator 10.

The reaction medium is maintained at a boiling temperature above about 30° C. to below the temperature above which substantial decomposition of chlorine dioxide occurs, while a subatmospheric pressure is applied to the generator.

A gaseous mixture of chlorine dioxide, chlorine and steam evaporated from the reaction medium is removed from the generator 10 by line 16 for processing in known manner to provide an aqueous solution of chlorine dioxide.

After start up, the reaction medium achieves saturation with sodium sulphate which crystallizes from the reaction medium. Under the reaction conditions specified, the sodium sulphate crystallizes as anhydrous neutral sodium sulphate. The sodium sulphate is removed from the generator 10 by line 18 as a slurry with the reaction medium.

The slurry is forwarded to a cyclone separator 20 for thickening, such as from a slurry concentration of about 1 to about 30 wt.% to about 50 to about 80 wt.%. The cyclone underflow consisting of thickened slurry is forwarded by line 22 to a decantation-washing apparatus 24. In some instances, an excess of sodium sulphate crystals to that to be processed by the washing apparatus 24 may be forwarded from the cyclone separator 20 by line 22 to ensure that the washing apparatus 24 always remains full of crystals. The excess crystals recycle to the generator 10 with overflow wash water from the washing apparatus 24.

The washing apparatus 24 may be located in any desired relationship with respect to the generator 10. For example, the washing apparatus 24 may be located directly below the generator 10, or alternatively, the washing apparatus 24 may be located alongside the generator 10.

The washing apparatus 24 comprises a plurality of superimposed decantation washing and thickening compartments 26 which are fluidly connected to each other, as described below.

The thickened slurry in line 22 enters the topmost compartment 26 while wash water forwarded from the next-lower compartment 26 by line 28 is also fed into the top-most compartment 26. The soild phase settles onto a conical surface 30 which separates the top-most compartment 26 from the next-lower compartment 26 while the liquor phase is removed from the top-most compartment 26 by line 32 for recycle to the generator 10 by line 34 along with the overflow liquid phase from the cyclone separator 20 in line 36. The solids in slurry form are permitted to flow under the influence of gravity to the next-lower compartment 26 through an unobstructed transfer pipe 38.

Slurry transfer under the influence of gravity in this way has been found to be successful and is preferred. Suitable settled crystal disturbing means, such as vibrators and rakes, however, may be used to assist in the transfer operation.

Wash water enters the transfer pipe 38 by line 40 communicating therewith and mixes with the transferred slurry. The wash water fed in this way is decanted from an upper region of the next-lower compartment 26, by line 40. The process of mixing, decantation and thickening then is repeated in this next-lower compartment 26.

The direct communication between line 40 and the transfer pipe 38 for feeding wash water to the respective compartment 26 has been found to operate satisfactorily and is preferred. Other wash water feeding operations may be used, however, such as, the use of a ring manifold located below the transfer pipe 38, or multiple wash water inlets to the transfer pipe 38.

The operations of transfer, dilution, decantation and thickening are repeated in each successively lower compartment 26 until the finally washed and thickened sodium sulphate product results and is removed from the lower-most compartment 26 by line 42 communicating therewith through a suitable extractor device 44. The extractor device 44 preferably is a variable capacity extracting device, such as, a rotary valve, a pinch valve or a Moyno pump. The product slurry in line 42 typically comprises 50 to 80% by weight solid neutral anhydrous sodium sulphate, 40 to 16% by weight water and 4 to 10% by weight dissolved sodium sulphate.

The rate of removal of product slurry by line 42 is substantially the same as the rate of flow of slurry through the column 24, so that the column 24 remains full of slurry at all times. As already mentioned, intermittent variations in flow rate which may tend to deplete the column may be smoothed out by overfeeding slurry to the top-most compartment 26, with the excess crystals recycling by lines 32 and 34.

Fresh warm wash water is fed by line 46 to the transfer pipe 38 connecting the lower-most compartment 26 with the next-higher compartment 26. The wash water used in each successively-higher compartment 26 is the increasingly contaminated liquid overflow from the next-lower compartment 26.

The liquor removed from the top-most compartment 26 by line 32 is equivalent in volume to that introduced to the apparatus 24 by line 46 and by line 22, less liquor exiting with the product through exit pipe 42.

In each compartment 26 of the decantation-washing apparatus 24, therefore, the thickened slurry entering by line 22 is mixed and diluted with a weak wash solution overflowing or decanting from a next later stage of decantation-washing. In each case, after thickening, the crystals flow through the transfer pipe 38 to the next stage of washing and the overflow is collected and utilized for washing purposes in an earlier stage of decantation-washing.

Small diameter crystals not settled in compartment 26 decant with the wash water and are transferred by pipe 40 to the next higher compartment. The flow velocity through pipe 40 should be such as to minimize plugging by the crystals and generally a flow velocity in excess of about 3 ft/sec is used.

The flow of crystals from one compartment to the next through the transfer pipe 38 is effected by gravitational forces. This transfer mechanism, which is preferred, has been found to be effective in ensuring that liquor from the next-lower compartment 26 does not pass to the next-higher compartment 26 through the transfer pipe 38.

It is preferred to design the individual compartments 26 to act as mass flow cones to permit very ready complete gravitational transfer of the solids settling on the particular conical surface 30 into the next-lower compartment 26 through the respective transfer pipe 38. The conical surface 30 and the transfer pipe 38 may be suitably shaped and dimensioned to achieve this result, with the transfer pipe 38 having any desired cross-sectional shape, such as, round or oval.

However, a positive flow control device may be used, if desired, to achieve this purpose and suitable flow control devices include a weir overflow device, a liquid seal which alternatively communicates with the upper and lower compartments but at no time with both, or an auger or similar helical screw device.

The decantation-washing apparatus 24 in the illustrated preferred embodiment effects its operations without the necessity for any moving parts and hence is simple in construction and virtually maintenance free.

The use of a cyclone separator 20 to effect the initial thickening of the slurry in line 18 is preferred since the thickening operation is a rapid one and the aqueous phase of the thickened slurry is diluted by the wash water fed by line 28 in the top-most compartment 26, so that residual chlorine dioxide generation is inhibited. However, thickening may be effected in the top-most compartment 26 of the decantation-washing column 24, if desired, with the slurry in line 18 being fed directly thereto.

The decantation-washing procedure in apparatus 24 has been described with reference to one particular chlorine dioxide generating system effected in generator 10. As already mentioned, the washing procedure may be effected on any solid by-product of a chlorine dioxide generating process effected in either a single vessel generator-evaporator-crystallizer or where the solid product is precipitated in a separate crystallizing zone.

There are several parameters which are important to successful decantation-washing in the column 24. In each compartment 26, two separate operations are required to obtain efficient washing, namely, effective mixing of the transferred slurry and decanted wash water and effective settling and thickening of the crystals on the surface 30.

The mixing of the transferred slurry and decanted wash water is dependent on several variables, including the dimensions of the transfer pipe 38, the throughput of solids and wash water in the column 24, the wash water velocity engaging the transferred slurry and the number of wash water inlets.

One of the important features of the invention is prevention of wash water entering a given compartment from flowing upwardly through the slurry transfer pipe to the next-higher compartment, otherwise effective decantation-washing is not possible. In order to prevent such upward wash water flow in the illustrated embodiment, the slurry flow downwardly through the transfer pipe 38 is maintained considerably in excess of the upward flow rate of wash water which would occur through a static bed of crystals, as determined from permeability tests. A factor of at least 1000 times the permeability rate often is used, although any excess theoretically may be used to ensure that no upward wash water flow occurs. To achieve this condition, flow rates through the transfer pipe 38 in the range of about 2 to about 6 ft/min/sq.ft. of pipe cross section preferably are employed, suitably about 4.0 ft/min/sq.ft. of pipe cross section. These values correspond to a cross-sectional area of transfer pipe 38 of about 0.005 to about 0.015 ft.²/ton solids/day, suitably about 0.01 ft.²/ton solids/day.

The dimensions of the transfer pipe 38 are also designed to maintain the slurry velocity in the pipe below a value above which fluidization occurs and, in this regard, the transfer pipe 38 is generally dimensioned to provide a Froude Number value in the range of about 0.05 to about 0.15. The Froude Number is determined by the equation:

$$N_{FR} = V_c^2/gd$$

wherein

Vc is the flow velocity, d is the diameter of the smallest particle to be retained, and g is acceleration due to gravity.

The unit area of the column required for any given material is determined from batch settling test experiments carried out at the desired slurry concentration. This method is well known and was first outlined by Coe and Clevenger in Trans. Am. Inst. Mining Engineers, Vol 55, p. 356 (1916) and a mathematical model and analysis for determination of thickener unit areas has been presented by Talmage and Fitch, Industrial and Engineering Chemistry, vol 47 (1), p. 38 (1955).

The latter model provides the following equation:

Unit area = (tu/Co Ho) sq.ft/lb solids/sec.

wherein tu is the time at the intersection of the tangent to the settling curve for the slurry taken at an arbitrary settling time and the minimum slurry height at maximum concentration Co is the initial concentration of slurry (lb/cu.ft)

Ho is the initial slurry height for settling.

The unit area may vary widely depending on the tu value chosen and conveniently is in the range of about 0.07 to about 0.11 ft²/ton solids/day, for example, about 0.092 ft²/ton solids/day.

The overall height of the column 24 depends on the number of compartments 26 present in the column and the individual height of each compartment. The number of compartments 26 is dependent on the washing efficiency of each individual stage. The efficiency of any individual stage can be calculated from the equation:

$$E = \frac{\text{Solute in} - \text{Solute out}}{\text{Solute in}} \times 1.25$$

where Solute in and Solute out are the solute flows associated with the solids flows into and out of the compartment. The factor 1.25 is used in the foregoing equation because, for a fully settled bed of solids in a saturated solution of the salt, the composition of the mixture is about 80% salt (both solid and dissolved) and 20% water.

From these values, given a tray efficiency of about 60%, a unit area rate of 0.092 ft/ton/day and a designed overall efficiency of greater than 96%, a column having 5 compartments 26 would be required.

Figure 2:
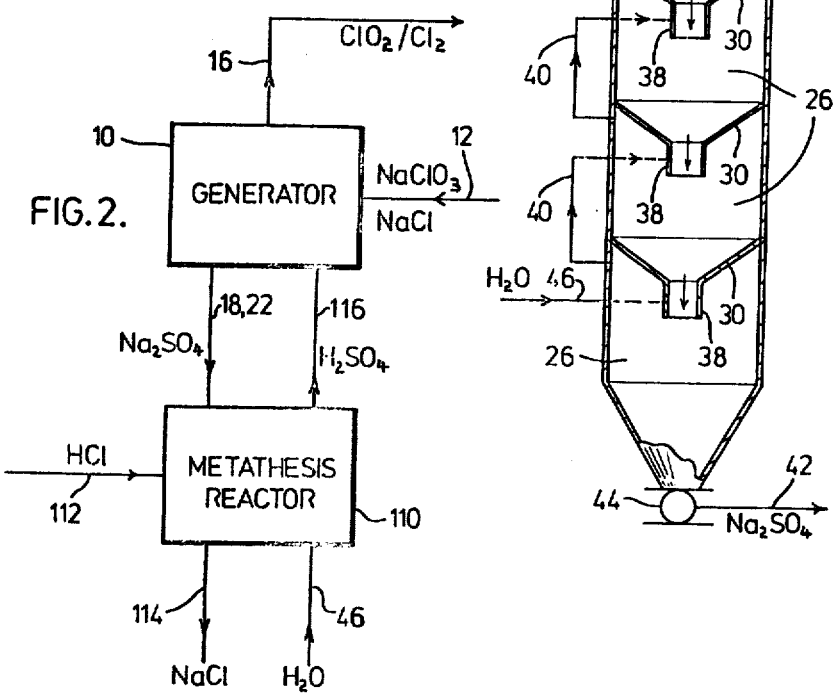
FIG. 2 is a schematic flow sheet of an apparatus for also effecting the metathesis process of the invention.

Turning now to consideration of FIG. 2, there is illustrated the embodiment of the invention involving metathesis reactions. As shown therein, the washing apparatus 24 now assumes the form of a reactor 110. The physical form of the reactor 110 is the same as the washing apparatus 24 described above in connection with FIG. 1. In the embodiment of FIG. 2, hydrochloric acid is fed to one of the middle compartments 26 by line 112 while fresh wash water is fed to the lowest compartment by line 46.

The sodium sulphate slurry, in addition to being washed to remove entrained reaction medium, is reacted with the hydrochloric acid, forming solid sodium chloride and sulphuric acid. The solid sodium chloride resulting from the metathesis reaction and subsequently washed, is removed from the reactor 110 by line 114 while the sulphuric acid along with the residual reaction medium washed from the slurry is passed by line 116 to the generator 10.

Under circumstances of 100% conversion of the sodium sulphate to sulphuric acid by this procedure, an external source of sulphuric acid is not required for the process, and the sodium chloride produced may be used to provide all the sodium chloride and sodium chlorate requirements of the generator 10, so that the system is self-regenerating with respect to those chemicals, so that the overall process is:

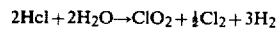

The metathesis reaction also may be carried out in reactor 110 independently of a washing operation. In this case, hydrochloric acid, or other metathesis reactant, is fed to the lower-most compartment 26 of reactor 110 and then, if desired, washing of the crystals resulting from the metathesis may be carried out in a separate multistage decantation washer 24 in analogous manner to that described with respect to FIG. 1.

The metathesis reactor 110 also may be used to convert sodium acid sulphate from the generator 10 when such material is the by-product of the chlorine dioxide generating process to neutral sodium sulphate by omitting the hydrochloric acid feed.

The invention is illustrated by the following Example:

EXAMPLE

A thickener-washing column of the type illustrated in FIG. 1 was set up with five plates 30, a diameter of 10 inches and a length of 10 feet. The column was operated at an ambient temperature of about 20° to 25° C. with a slurry of sodium chloride of concentration 17% by weight being fed to the top of the column, thickening of the slurry being effected in the top-most compartment and a slurry of about 65% by weight solids being removed from the lower end at an overall extraction efficiency of about 98%.

The column was operated on a continuous basis at a solids rate equivalent to about 4 tons per day of chlorine dioxide production and a ratio of wash water to salt of about 1. The average washing efficiency for each stage of the column was determined to be about 67%.

SUMMARY OF DISCLOSURE

In summary of this disclosure, the present invention provides an efficient washing operation for crystalline by-products of chlorine dioxide processes and procedures for conversion of certain of the by-products to other chemical forms, with or without the washing. Modifications are possible within the scope of the invention.

What we claim is:

1. An apparatus consisting of:

an elongate generally cylindrical upright tower having a cross-sectional dimension corresponding to a unit area value of about 0.07 to about 0.11 ft.$^2$/ton solids/day, a plurality of superimposed compartments within said tower extending from an upper-most compartment to a lower-most compartment, each separated from the next-lower compartment by a downwardly-sloping frusto-conical bottom wall, each said bottom wall having a central opening and being joined to a short axially downwardly-directed unobstructed pipe having an inlet coinciding with the central opening in said bottom wall, said short pipe establishing a fluid relationship between adjacent superimposed compartments and having a cross-sectional dimension corresponding to a unit area value of about 0.005 to about 0.015 ft.$^2$/ton solids/day, slurry inlet means communicating with an upper region of the upper-most of said superimposed compartments for feeding thereto a slurry of solid materials to be treated in the apparatus, slurry outlet means communicating with a lower region of the lower-most compartment for removing therefrom a slurry of solid materials treated in the apparatus, treatment liquid inlet means communicating directly with the short pipe extending between the lower-most compartment and the next-higher compartment for feeding treatment liquid to said apparatus, spent treatment liquid outlet means communicating directly with an upper region of the upper-most compartment for removing spent treatment liquid for said apparatus, first liquid transfer means extending directly between an upper region of each said compartment in said column, with the exception of the two upper-most compartments, and said short pipe entering the next-higher compartment for transfer of liquid therethrough from one compartment to the next-higher compartment, and second liquid transfer means extending directly between an upper region of the next-lower than said upper-most compartment and an upper region of said upper-most compartment for transfer of liquid therethrough to said upper-most compartment.

2. The apparatus of claim 1 wherein said treatment liquid inlet means comprises a pipe extending radially through the side wall of the tower and terminating at said short pipe joining said lower-most compartment and the next-higher compartment in fluid flow communication therewith.

3. The apparatus of claim 1 or 2 wherein each said first liquid transfer means comprises a pipe having a first portion extending from said upper region of the respective compartment externally of said tower and a second portion extending radially through the side wall of the tower and terminating at the short pipe entering the next-higher compartment in fluid flow communication therewith.

* * * * *